(12) United States Patent
Chen et al.

(10) Patent No.: US 6,272,630 B1
(45) Date of Patent: Aug. 7, 2001

(54) METHOD AND DEVICE FOR RESERVING WAKE-UP FUNCTIONS OF COMPUTER SYSTEM AFTER POWER LOSS

(75) Inventors: Tseng-Wen Chen, Jubei; Cheng-Chih Wang, Taipei, both of (TW)

(73) Assignee: Winbond Electronics Corporation (TW)

( * ) Notice: Subject to any disclaimer, the term of this patent is extended or adjusted under 35 U.S.C. 154(b) by 0 days.

(21) Appl. No.: 09/460,966

(22) Filed: Dec. 14, 1999

(51) Int. Cl.[7] ............................................. G06F 9/24
(52) U.S. Cl. ..................................................... 713/2
(58) Field of Search ........................ 714/34, 1, 2; 713/1, 713/2, 330; 323/901, 234, 371

(56) References Cited

U.S. PATENT DOCUMENTS 5,327,531 * 7/1994 Bealkowski et al. .................... 714/6
6,081,890 * 6/2000 Datta ....................................... 713/1

* cited by examiner

*Primary Examiner*—Shawn Riley

(57) ABSTRACT

A solution for maintaining the wake-up functions of a computer after a power loss is provided. To reset parameters relating to the wake-up functions, the computer is automatically turned on when the power is supplied again. Then, the computer is forced to be power-off by an output signal to switch the computer system to a state capable of executing the wake-up functions.

20 Claims, 2 Drawing Sheets

METHOD AND DEVICE FOR RESERVING WAKE-UP FUNCTIONS OF COMPUTER SYSTEM AFTER POWER LOSS

FIELD OF THE INVENTION

The present invention relates to a method and device for a power on/off control, and more particularly to a method and device for reserving wake-up functions of a personal computer after a power loss.

BACKGROUND OF THE INVENTION

Intel® has provided a specification, ATX, for the personal computer industry. The ATX motherboard provides several functions such as soft-off, timer-on, and multi-wake-up functions such as waked up by the modem, LAN, mouse, and keyboard . . . etc. The ATX motherboard is also compatible with the PC98 specification and the advance configuration and power interface (ACPI). Conventionally, a computer system may have two global system states: a mechanical off state and a working state. However, a computer with an ATX motherboard may be in a mechanical off state, a soft-off state, a sleeping state or a working state. This may meet problems in a power-loss situation. At the beginning, an Intel chipset can only provides a working state for the ATX computer when the power is supplied again. However, in many situations, a working state is not expected. To solve the problem, Intel provides a circuit for the user to determine whether the system is in a working state or a soft-off state when the power is provided again.

However, there still exists some problems. When the power is lost, some parameters needed for the system operation may be lost. These parameters are provided by BIOS and may be adjusted by the user. Unless the system is reset, these parameters cannot be recovered. If a soft-off state is chosen by an Intel chipset user, these parameters cannot be recovered unless the user presses the bottom to reset the system.

An ATX power supply can be in a waiting state to wait for a wake-up event. A waiting voltage 5VSB is provided by the ATX power supply to the system to enable the wake-up ability. A signal SUSC is outputted by the chipset. When the signal SUSC is inactive, the chipset identifies that the system is in a working state. Oppositely, if the signal SUSC is active, it represents that the chipset identifies that the system is in a waiting state which is capable of executing an wake-up event. However, the conventional chipset cannot properly generate a correct SUSC signal after a power loss. For example, an Intel PIIX4 south-bridge chipset can only generate an inactive SUSC signal when the waiting voltage 5VSB is lost and provided again, no matter whether the system is in a working state or a waiting state. Consequently, the data needed for the wake-up event is lost and cannot be reset since the chipset identifies that the system is in a working state even if it is actually in a waiting state. Unless the user presses the panel button to restart the computer, the wake-up functions will be invalid.

Such a process is relatively inconvenient for the user. For example, a timer-on function is set that the computer is turned on at 6:00 a.m. and a power-loss happens at midnight. Although the power may be supplied again before 6:00 a.m., the timer-on function still cannot be executed since the parameter about when to turn on the computer is lost. Other functions about the wake-up event cannot be executed because of the same reason.

It is then attempted by the present invention to solve the above-mentioned problems.

SUMMARY OF THE INVENTION

An object of the present invention is to provide a device for ensuring the execution of a wake-up event of a system after a power loss.

Another object of the present invention is to provide a device for control the on/off state of a computer compatible with the ATX specification.

Still another object of the present invention is to provide a device that can automatically reset the chipset after a power loss.

In addition, the present invention provides a method for maintaining a wake-up function of a computer having a chipset in a waiting state after a power loss. To reset the chipset, the computer is firstly turned on when power is supplied again. Accordingly, the parameters associated with the wake-up functions are restored. Then, an override power-off signal is provided to switch the computer to a waiting state capable of executing these wake-up functions.

The computer is preferably compatible to an ATX specification and an advanced configuration and power interface (ACPI) specification. According to the ACPI specification, the override power-off signal is an output signal lasting for 4 seconds.

The output signal is outputted to the chipset to switch the SUSC signal of the chipset to an inactive state. To enable the original button-control functions, the output signal is preferably executed a logic AND operation with a panel switch output signal of the computer before outputted to the chipset.

The chipset identifies that the computer is in a waiting state according to the inactive output signal. The computer is then switched to the waiting state.

The device of the present invention includes a power detecting device and a power-control device. The power detecting device is a circuit for detecting the power loss and generating a first signal when the power is supplied again. The power-control device turns on the computer according to the first signal to reset the chipset, and then switches the computer to a waiting state capable of executing the wake-up functions.

The computer may further include an ATX power supply electrically connected to the chipset, the power detecting device, and the power-control device. Preferably, the computer is also compatible to an ACPI specification.

The power-control device preferably switches the computer to the waiting state according to a second signal outputted by the chipset. The second signal is preferably an SUSC signal. The power-control device switches the computer to the waiting state when the SUSC signal is in an inactive state.

A third signal is preferably outputted from the power-control device to the chipset in response to the first signal. The third signal is kept in an inactive state for a specific period of time to switch the second signal into the inactive state. The specific period of time is preferably 4 seconds.

The device of the present invention may further include a panel switch control device electrically connected between the power-control device and the chipset. The third signal, instead of being directly outputted to the button-in terminal of the chipset, may be sent to the panel switch control device for being executed therein a logic AND operation with a panel switch output signal to obtain a fourth signal to be outputted to the chipset.

When the power-detecting device detects a power loss, a battery voltage is preferably supplied to the computer for reserving an operation configuration of the computer before the power is lost.

The power-control device may further include an enabling terminal for enabling the power-control device.

The present invention may best be understood through the following description with reference to the accompanying drawings, in which:

DETAILED DESCRIPTION OF THE PREFERRED EMBODIMENTS

According to the setting of a system, the on/off status after a power loss can be generalized as four cases:
1. The system is in a working state before the power loss and is maintained in the working state after the power is provided again.
2. The system is in an off state before the power loss, and is maintained in the off state after the power is supplied again.
3. The system is override-off after the power is supplied again, no matter whether the system is in a working state or an off state before the power-loss.
4. The system is forcibly turned on after the power is supplied again, no matter the system is in a working state or an off state before the power-loss.

Of course, the wake-up event happens when the computer system is in an off state, so the present invention is applied for solving the problems encounted in cases 1 and 3. In such cases, the system is preset in an off state without resetting the chipset, so the wake-up event can not be executed.

Figure 1:
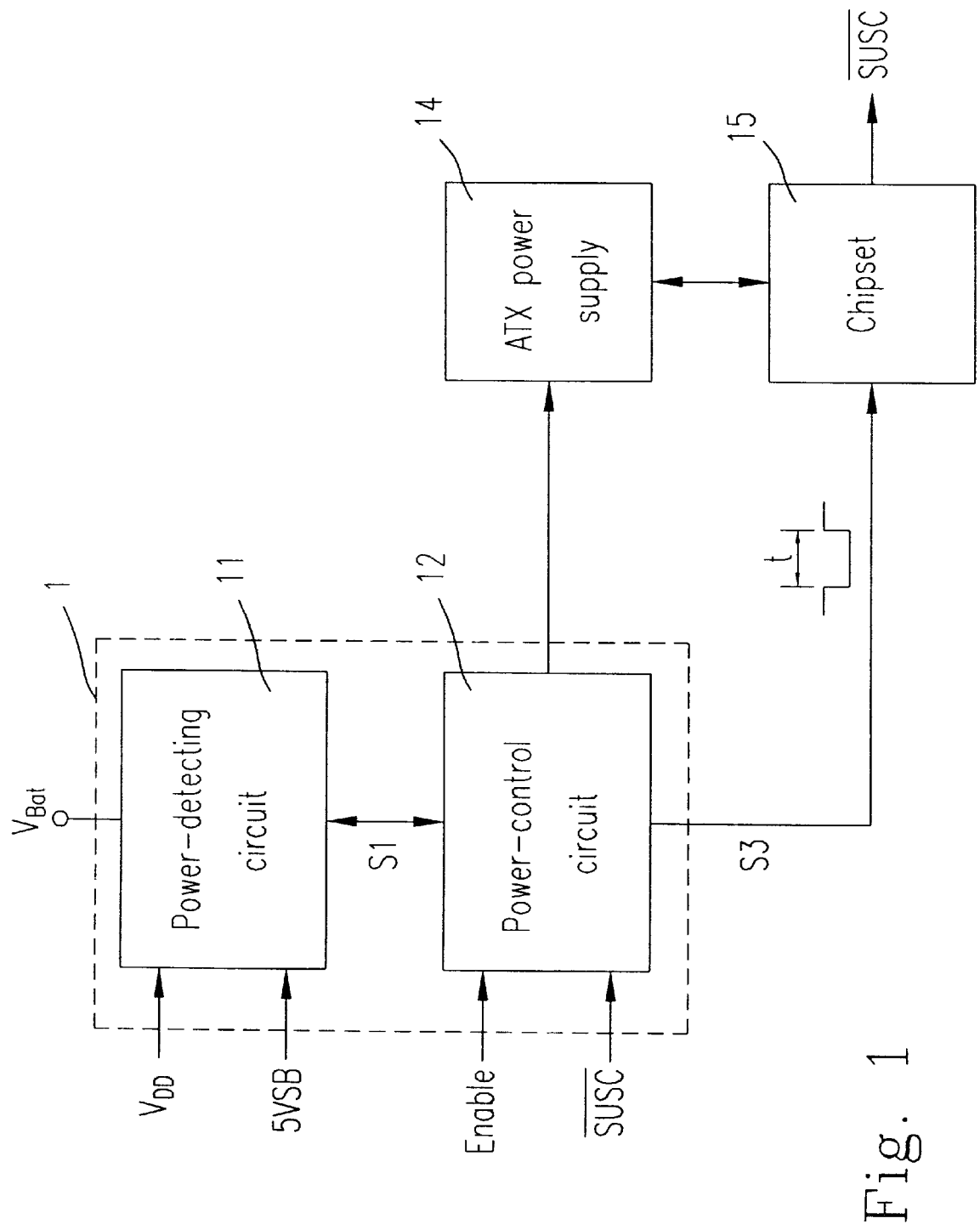
FIG. 1 is a diagram illustrating a preferred embodiment of an on/off control circuit for a computer according to the present invention.

As shown in FIG. 1, the on/off control circuit 1 includes a power loss detecting circuit 11 and a power-control circuit 12 (PS_ON control circuit). The power-control circuit 12 is electrically connected to an ATX power supply 14 and a chipset 15. The power-control circuit 12 further includes an input end for inputting therein an enable signal to enable the device. The enable signal may come from a battery back-up register. Another input end is provided for the power-control circuit 12 to input therethrough the SUSC signal from the chipset 15. The power-control circuit 12 controls the working/waiting state of the ATX power supply 14 according to the active/inactive state of the SUSC signal.

The Advanced Configuration and Power Interface(ACPI) specification (provided by Intel, Microsoft and Toshiba) includes a "power button over-ride" feature. Such a feature allows the user to press the power button for 4 seconds to turn off a hung system. The present invention utilizes this feature to restart the computer and activates the wake-up function. Referring to FIG. 1, when the system is in an off-state wherein the system can be waked up by a wake-up event, a waiting voltage 5VSB is provided by the ATX power supply 12 and applied to the chip set 15 of the system. Accordingly, the system can be awaked by the wake-up event. The on/off control circuit 1 is operated with a voltage Vbat provided by a battery (no shown).

When the electric power is broken, the power supply 12 can no longer provide the waiting voltage 5VSB. At this moment, the power-detecting circuit 11 will detect the loss of 5VSB. When the power is supplied again, it is also detected by the power-detecting circuit 11.

When 5VSB is lost, the power-detecting circuit 11 will backup the system configurations before the power loss and reserve it with battery power. If the system is preset to be in an off state when the power is supplied again (such as Case 1 or Case 3), a first signal S1 will be generated by the power-control circuit 12 to initialize the function of the power on/off after the power is supplied again.

After receiving the first signal S1, the power-control circuit 12 will identify that the system is preset to be in an off state as before the power loss or to be over-ride power off. Accordingly, the AXT power supply 14 will be switched from a waiting state to a working state and provide a working voltage VDD for the system. At the same time, the system will reset all the devices including the chipset controlling the wake-up event. The reset devices will return to the situations before the power loss.

Simultaneously, a third signal S3 will be generated by the power-control circuit 12. The third signal S3 will be in an active state for a specific period of time. The third signal is transmitted to the button-in terminal of the chipset 15. Accordingly, the chipset 15 will be forced to generate the second signal S2 (SUSC) to switch the ATX power supply 14 from a working state to a waiting state. Since all the devices have been reset before the system is switched to the waiting state, the wake-up functions will be valid. Consequently, the reliability and convenience of the system will be increased.

The specific time period is determined by the system. The ATX power supply can be switched from a working state to a waiting state within four seconds. Furthermore, the second signal SUSC is switched from inactive to active. The power-control circuit 12 will detect the switch of the SUSC and thus identify that the ATX power supply 14 is in a waiting state. At this moment, the third signal S3 will be switched from the active to the inactive state.

Figure 2:
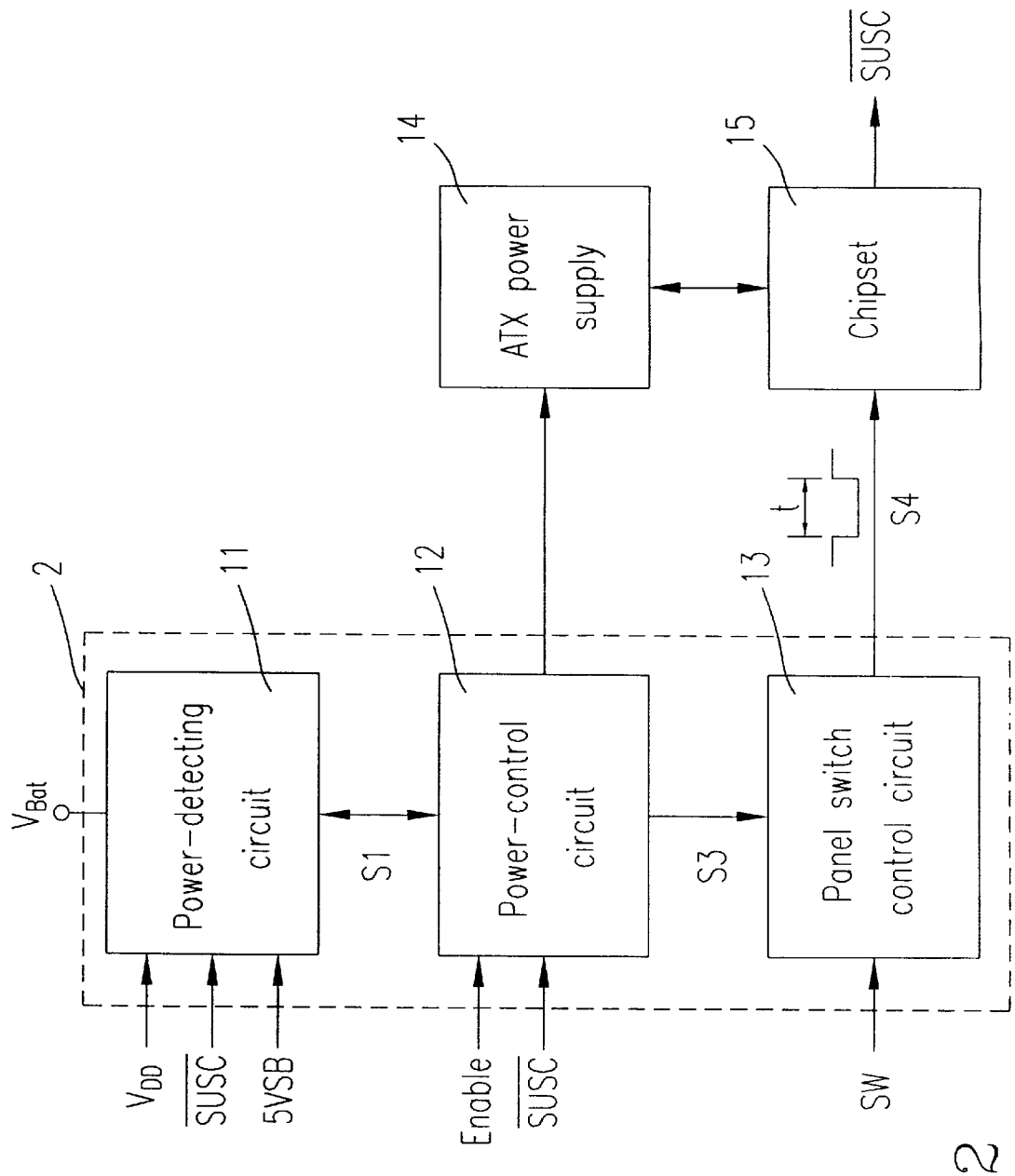
FIG. 2 illustrates another preferred embodiment of an on/off control circuit for a computer according to the present invention.

FIG. 2 illustrates another preferred embodiment of the present invention. Compared with the device illustrated in FIG. 1, the device shown in FIG. 2 further includes a panel switch control circuit 13 electrically connected between the power-control circuit 12 and the chipset 15. The third signal S3 outputted from the power-control circuit 12 and the switch signal SW outputted from the panel power button (not shown) are inputted to the panel switch control circuit 13. A logic-AND operation is executed between the signals S3 and SW. According to the result of the logic-AND operation, the fourth signal S4 is generated and outputted by the panel switch control circuit 13 to the button-in terminal of the chipset 15. Accordingly, both the panel power button and the power-control circuit can control the on/off state of the ATX power supply 14 through the chipset 15. Of course, the panel switch control circuit 13 can be an AND gate.

According to the ACPI specification, the computer will be override power-off when the power button is pressed for 4 seconds. According to such a specification, the present invention provides a solution for maintaining the wake-up functions to be valid after a power loss. When a power loss happens, some parameters about the wake-up events will be lost. Such a matter will influence the wake-up functions when the system is preset to be in an off-state after the power is supplied again. To reset these parameters, the computer is firstly turned on when the power is supplied again. During the turn-on procedure, the chipset which controls the wake-up event will be reset. Secondly, the computer is forced to be power-off by an output signal. Such an output signal can be executed a logic-AND operation with the output signal of a power button on the panel. The operating result will be sent to the chipset to identify whether the computer is in an off-state or a working state. That is to say, when at least one of the output signals is in an inactive state, the signal sent to the chipset will be inactive. Accordingly, the chipset will identify that the computer is in an off-state and output an active SUSC signal. Since the chipset has been reset during the temporally power-on procedure, the wake-up functions are thus valid after a power loss.

To sum up, the present invention provides a method and device for maintaining the wake-up functions of a computer system after a power loss. The computer is preset to execute an automatically and temporally power-on procedure to reset the chipset. Then, the computer is forced to be power-off. Accordingly, the computer will maintain the wake-up functions after a power loss. Therefore, the present invention provides a more reliable and convenient method and device for dealing with the power-loss problem of a computer system.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for maintaining a wake-up function of a computer having a chipset in a waiting state capable of executing said wake-up function after a power loss, said method comprising steps of:
   automatically turning on said computer when power is supplied again for resetting said chipset; and
   providing an override power-off signal for said computer to switch said computer to said waiting state, wherein said computer is compatible to an advanced configuration and power interface (ACPI) specification.

2. A method according to claim 1 wherein said computer is compatible with an ATX specification.

3. A method according to claim 1, wherein said override power-off signal is an output signal lasting for a specific period of time.

4. A method according to claim 3 wherein said period of time is 4 seconds.

5. A method according to claim 3 wherein said output signal is outputted to said chipset.

6. A method according to claim 5 wherein a logic AND operation is executed between said output signal and a panel switch output signal of said computer.

7. A method according to claim 5 wherein said chipset identifies whether said computer is in said waiting state according to said output signal and switching said computer to said waiting state.

8. A device for maintaining a wake-up function of a computer having a chipset in a waiting state after a power loss, comprising:
   a power-detecting device for detecting said power loss and generating a first signal when power is supplied again; and
   a power-control device for turning on said computer according to said first signal to reset said chipset, and switching said computer to said waiting state, wherein said power-control device switches said computer to said waiting state according to a second signal outputted by said chipset, and said second signal is a SUSC signal.

9. A device according to claim 8, wherein said computer further includes an ATX power supply electrically connected to said chipset, said power detecting device, and said power-control device.

10. A device according to claim 8, wherein said computer is compatible to the ACPI specification.

11. A device according to claim 8 wherein said power-control device switches said computer to waiting state when said SUSC signal is an inactive state.

12. A device according to claim 11 wherein a third signal is outputted from said power-control device to said chipset in response to said first signal, and said third signal is kept in an inactive state for a specific period of time in order that said second signal generated by said chipset is switched to said inactive state according to said third signal.

13. A device according to claim 12 wherein said specific period of time is 4 seconds.

14. A device according to claim 8, further comprising a panel switch control device electrically connected between said power-control device and said chipset.

15. A device according to claim 14, wherein a third signal is outputted from said power-control device to said chipset in response to said first signal and received by said panel switch control device wherein a logic AND operation is executed between said third signal and a panel switch output signal to obtain a fourth signal to be outputted to said chipset.

16. A device according to claim 15 wherein said fourth signal is kept in an inactive state for a specific period of time in order that said second signal generated by said chipset is switched to said inactive state according to said fourth signal.

17. A device according to claim 16 wherein said specific period of time is 4 seconds.

18. A device according to claim 8 wherein when a power loss is detected by said power detecting device, a battery voltage is supplied to said computer for reserving a configuration of said computer before said power loss.

19. A device according to claim 8, wherein said power-control device further includes an enable terminal for enabling said power-control device.

20. A device for maintaining a wake-up function of a computer having a chipset in a waiting state after a power loss, comprising:
   a power-detecting device for detecting said power loss and generating a first signal when power is supplied again;
   a power-control device for turning on said computer according to said first signal to reset said chipset, and switching said computer to said waiting state; and
   a panel switching control device electrically connected between said power-control device and said chipset.

* * * * *